United States Patent
Cohen

(10) Patent No.: US 6,332,153 B1
(45) Date of Patent: Dec. 18, 2001

(54) APPARATUS AND METHOD FOR MULTI-STATION CONFERENCING

(75) Inventor: Alon Cohen, Rishon LeZion (IL)

(73) Assignee: Vocaltec Communications Ltd., Herzliya (IL)

(*) Notice: Subject to any disclaimer, the term of this patent is extended or adjusted under 35 U.S.C. 154(b) by 0 days.

(21) Appl. No.: 08/688,959

(22) Filed: Jul. 31, 1996

(51) Int. Cl.⁷ .................................................. G06F 15/16
(52) U.S. Cl. ........................................... 709/204; 709/203
(58) Field of Search ............................. 348/15; 370/261, 370/401, 260; 455/31.2, 570; 395/200.34; 379/93.09, 67, 93.21, 202, 204, 88, 389, 206; 709/203, 204

(56) References Cited

U.S. PATENT DOCUMENTS

| | | | |
|---|---|---|---|
| 3,775,563 | * 11/1973 | Klein | 348/15 |
| 3,970,797 | * 7/1976 | Johnson et al. | 370/261 |
| 4,008,376 | * 2/1977 | Flanagan et al. | 379/206 |
| 4,054,908 | * 10/1977 | Poirier et al. | 348/15 |
| 4,509,167 | * 4/1985 | Bantel et al. | 370/261 |
| 4,577,060 | * 3/1986 | Webb et al. | 455/31.2 |
| 4,878,242 | * 10/1989 | Springer et al. | 379/204 |
| 5,125,023 | * 6/1992 | Morduch et al. | 379/88 |
| 5,382,972 | * 1/1995 | Kannes | 348/15 |
| 5,432,907 | * 7/1995 | Picazo, Jr. et al. | 395/200.79 |
| 5,434,797 | * 7/1995 | Barris | 395/200.34 |
| 5,440,624 | 8/1995 | Schoof, II . | |
| 5,479,474 | * 12/1995 | Schwartzman et al. | 455/570 |
| 5,483,588 | * 1/1996 | Eaton et al. | 379/202 |
| 5,490,247 | * 2/1996 | Tung et al. | 435/501 |
| 5,491,695 | * 2/1996 | Meagher et al. | 370/260 |
| 5,583,922 | * 12/1996 | Davis et al. | 379/93.09 |
| 5,619,555 | * 4/1997 | Fenton et al. | 379/67 |
| 5,737,407 | * 4/1998 | Graumann | 379/389 |
| 5,812,552 | * 9/1998 | Arora et al. | 370/401 |
| 5,852,656 | * 12/1998 | Sato et al. | 379/93.21 |

FOREIGN PATENT DOCUMENTS 0 279 558 * 8/1988 (EP) .

OTHER PUBLICATIONS

Coolegem K G Et Al: "Multemedia desktop conferencing with Mias 1".

* cited by examiner

Primary Examiner—David Ton
(74) Attorney, Agent, or Firm—Darby & Darby

(57) ABSTRACT

A system and method for multi-media half-duplex conferencing in a computer network comprising a plurality of stations and a control server. The method and system include, respectively, means for and the steps of receiving a packet at the server from one station of the plurality of stations including a digital representation of information of at least one information type selected from audio information and video information, identifying the station as a transmitting station, blocking packets transmitted from the plurality of stations at the server except from the first transmitting station, distributing packets from the transmitting station, thereby providing audio information generated by a user of the transmitting stations to users of the other stations of the plurality of stations and repeating the steps of receiving, identifying, blocking and transmitting for a different one of the plurality of station, thereby replacing the transmitting station with a different transmitting station, thereby providing the half-duplex multi-station conference.

8 Claims, 5 Drawing Sheets

APPARATUS AND METHOD FOR MULTI-STATION CONFERENCING

FIELD OF THE INVENTION

The present invention relates to a method and system for half-duplex multimedia multi-station conferencing over a network generally and more particularly to a method and system for half-duplex audio multi-station conferencing over a network.

BACKGROUND OF THE INVENTION

Wide Area Computer Networks (WAN), in particular the INTERNET network, allow users to communicate multimedia information therebetween. For Example, the Internet Phone, commercially available from VocalTec Inc. of New Jersey, enable audio conferencing between two parties using two computer stations connected to the INTERNET and equipped with the INTERNET PHONE™ application.

In another application, multi-station multi-media conferencing Is provided. In multi-station conferencing, a number of users employ their computer station in order to hold a conference. Generally speaking, two types of multi-station conferencing exist, namely, full-duplex conferencing in which each user may speak and hear audio information, i.e. is able to simultaneously transmit and receive voice packets, and half-duplex conferencing in which one station is determined to be the current transmitting station at a time.

Full-duplex conferencing requires a mixing mechanism by which voice packets transmitted by each station are mixed in a network server so as to avoid the need to resolve according to predetermined criteria which participant will be the active participant. Obviously, mixing mechanisms directed to full duplex conferencing are costly and difficult to implement and require in addition a supplemental mechanism for self-hearing cancellation, such as an echo canceling algorithm.

Half-duplex conferencing requires a mechanism which will resolve who will be the user allowed to speak to all other at any particular time. In prior art half-duplex and conferencing, a resolving mechanism based on an arbitration procedure between voice packets, for example the procedure described in U.S. Pat. No. 5,434,797 to Barris is implemented.

Another drawback associated with conferencing systems in general and with multi-media multi-station conferencing in particular is that it is sometimes difficult for one participant to recognize who is the current participant. This problem is particularly difficult in multi-station network conferencing, such as in INTERNET multi-station conferences where participants which are not familiar with each other have to recognize who is the current participant.

SUMMARY OF THE INVENTION

An object of the present invention is to provide an improved method for half-duplex multi-media multi-station conferencing in a computer network.

In a preferred embodiment the multi-station half-duplex conference is an audio conference or an audio and video conference.

A further object of the present invention is to display the current active participant in a multi-station conference.

There is thus provided, in accordance with a preferred embodiment of the present invention, a method for multimedia half-duplex conferencing in a computer network which includes a plurality of stations and a control server. The method includes the steps of receiving a packet at the server from one station of the plurality of stations including a digital representation of information of at least one information type selected from audio information and video information, identifying the station as a transmitting station, blocking packets transmitted from the plurality of stations at the server except from the first transmitting station, distributing packets from the transmitting station, thereby providing audio information generated by user of the transmitting stations to users of the other stations of the plurality of stations; and repeating the steps of receiving, identifying, blocking and transmitting for a different one of the plurality of stations, thereby replacing the transimitting station with a different transmitting station, thereby providing the half-duplex multi-station conference.

Further, according to a preferred embodiment of the present invention, the step of replacing includes the steps of receiving a packet indicating an end of transmission of the representation of the information and receiving a packet from a different station, thereby providing the identification of the second transmitting station.

According to an alternative embodiment the step of replacing includes the steps of not receiving packets from the transmitting station for a predetermined period of time and receiving a packet from the second station after the predetermined period of time, thereby providing the activation of the second transmitting station.

In accordance with a preferred embodiment of the present invention, the method also includes the step of visually indicating to the users which user is utilizing the station which is transmitting station. Preferably, this step includes the steps of transmitting a packet including a user identification from the first station to the control server, adding the user identification to a participants list of users participating in the half-duplex conference, thereby providing a current participants list, storing the current identification list with an indication which station is the current transmitting user, providing the user identification list in the stations and displaying the identification list including the indication of the current transmitting user.

Further, the step of storing preferably includes the steps of storing an update of the current participants list with an indication which station is the current transmitting user, retrieving the update in the stations and displaying the update including the indication of the current transmitting user.

There is also provided, according to a preferred embodiment of the present invention, a system for multi-media half-duplex conferencing in a computer network which includes a plurality of stations and a control server which is capable of operating in accordance with the methods of the present invention.

There is further provided in accordance with a preferred embodiment of the present invention, a method for usually indicating to participants of a multi-station conference, both half-duplex and full-duplex conferences, which participant is the current active participant. The method includes the steps of providing a list of participants in the multi-station conference, determining a participant as a currently active participant and indicating to other participants of the multi-station conference who is the currently active participant or participants.

In a preferred embodiment the step of indicating includes the steps of providing the participants list or an updated portion thereof with an indication of the currently active participant and displaying the identification list including the indication of the current active participant or participants.

Further, according to a preferred embodiment of the present invention, the steps of providing the participant list and the step of providing are independent of the step of indicating.

There is also provided, according to a preferred embodiment of the present invention, a system for visually indicating to participants of a multi-station conference, both half-duplex and full-duplex, which participant is the current active participant. The system includes a human or automatic operator for providing a participant lists or an update thereof and a conference bridge server connected to first means, preferably but not limited to telephone means, for determining a currently active participant and to second means, preferably but not limited to computer network means, independent of the first means for providing the visual indication of the currently active participant to the participants of the multi-station conference.

In a preferred embodiment, the conference bridge server includes a CPU for receiving the participant lists or the update thereof, a storage unit for storing the participant lists and the updates thereof and a voice activity unit connected to the first means for detecting the currently active participant. The CPU is operative to provide to the participants list or an update thereof upon with an indication of the currently active user upon detecting a currently active participant or participants by the voice activity unit.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
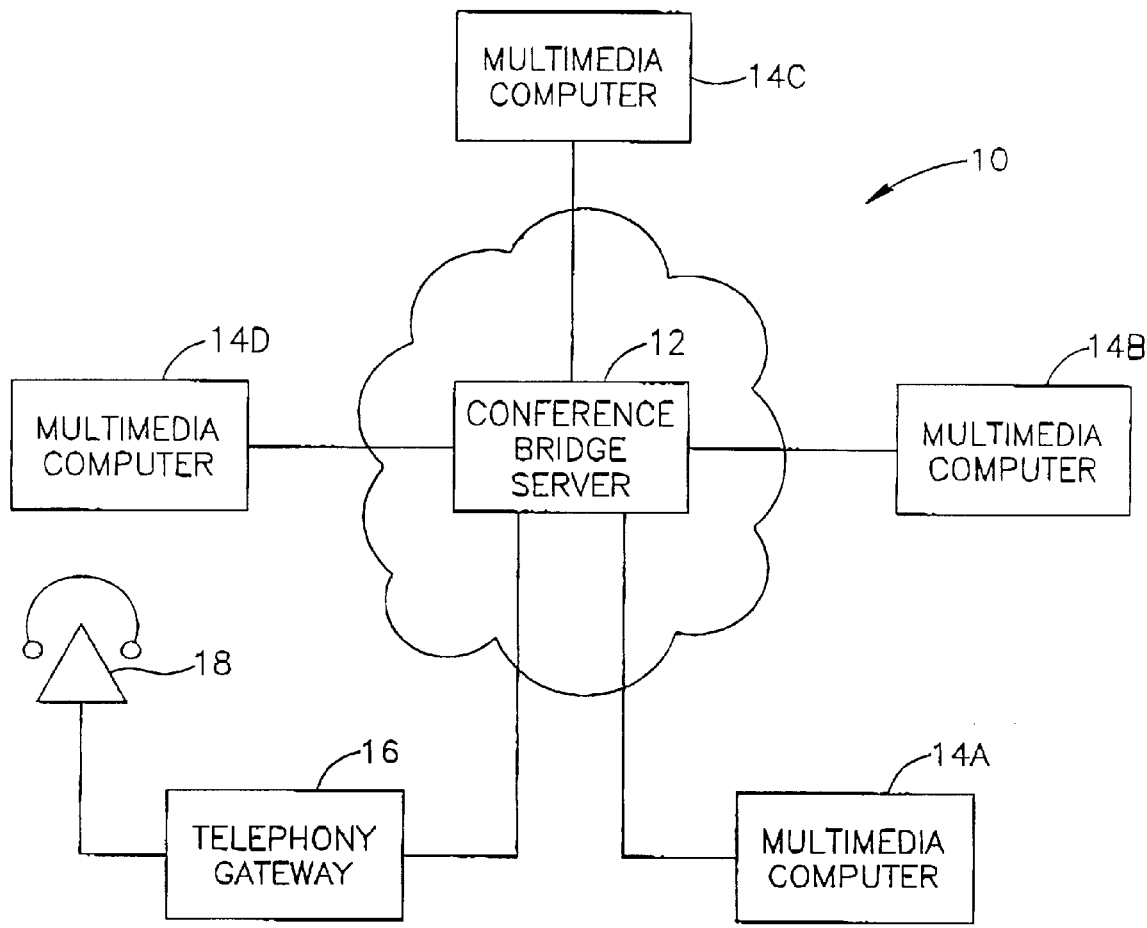
FIG. 1 is a schematic block diagrams of a Wide Area Network for providing half-duplex multimedia multi-station conferencing, constructed and operative in accordance with a preferred embodiment of the present invention.

Reference is now made to FIG. 1 which illustrates a Wide Area Network (WAN), generally referenced 10, for providing half-duplex multi-media multi-station conferencing, constructed and operative in accordance with a preferred embodiment of the present invention. In a preferred embodiment, the WAN is the INTERNET.

In the preferred embodiment, WAN 10 is operative to provide half-duplex multi-station audio conferencing and the present invention is described by way of a nonlimiting example with respect thereto.

WAN 10 comprises a conference bridge server 12, a plurality of multimedia computer stations 14 of which four are shown as a non limiting example in the illustrated embodiment and referenced 14A, 14B, 14C and 14D. In a preferred embodiment server 12 and stations 14 are physically remote one from the other and are connected via the INTERNET network. Multimedia computer stations 14 may be any suitable multimedia computer, such as a personal computer equipped with an INTERNET connection and audio transceiving application. An example of a suitable multimedia computer station 14 is the PACKARD BELL of the U.S. personal computer equipped with the INTERNET PHONE™ application. The INTERNET PHONE™ gateway application, commercially available from VocalTec Inc. of New Jersey, U.S.A., may be implemented with any other suitable personal computer as well.

In the illustrated embodiment WAN 10 also comprises a telephony gateway 16 equipped with the INTERNET PHONE™ gateway application connected to a conventional telephone 18 and enables it to operate as one of the WAN audio transceiving applications.

Each of stations 14 and gateway 16 comprises a voice activity detection mechanism, such as the one incorporated in the INTERNET PHONE™ which is sensitive to voice signals representing audio information generated by respective users of stations 14 and telephone 18.

These transmitted voice packets representing audio information are utilized to determine the current speaker in the half-duplex multi-station conference as described in detail with reference to FIG. 2 hereinbelow.

Figure 2:
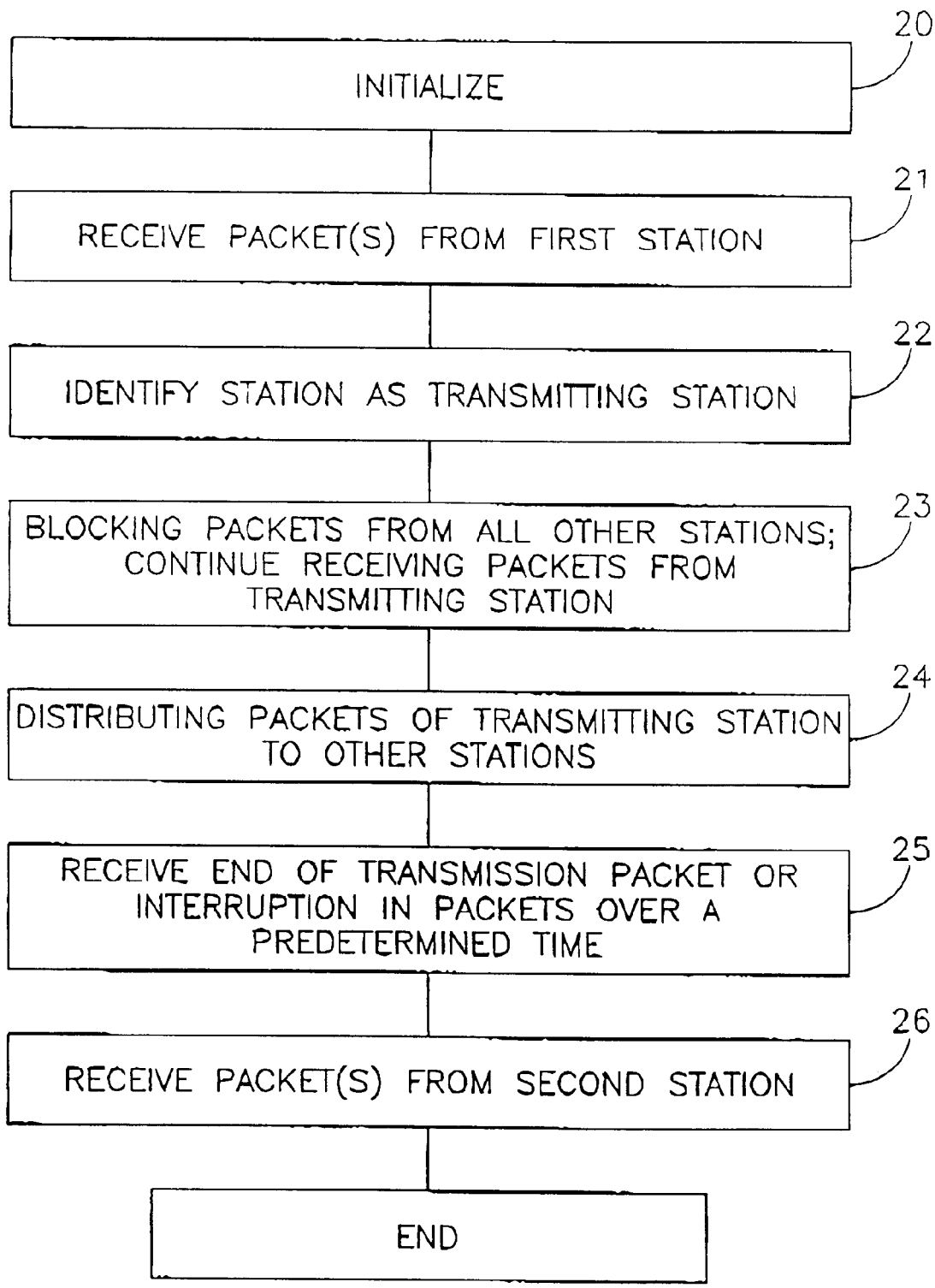
FIG. 2 is a schematic block diagram illustration of a resolving mechanism for determining the current active multimedia station of the network of FIG. 1.

FIG. 2 illustrates a preferred method of operating the multi-station multi-media conference by server 12. First, a step 20 of initialization takes place. In this step, parameters such as the maximal number of participants can be determined. Participants from stations 14 and telephone 18 may now connect to the half-duplex conference. In step 21, server 12 receives a packet or packets from a first station, say 14A of the plurality of stations 14. The packet or packets indicate the beginning of information transmission in at least one type of media. In the preferred embodiment server 12 receives audio packets indicating the beginning of a speech burst in the format provided by the INTERNET PHONE™.

In step 22, server 12 identifies station 14A as the current transmitting station. Therefore, as indicated in step 23, server 12 will block packets from all other stations 14 and telephony gateway 1B and will continue to receive packets from current transmitting station 14A.

Each received packet is generally immediately distributed as indicated by step 24 to stations 14B–14D and telephone 18 via gateway 16, thereby providing audio information generated by the user employing station 14A.

Server 12 replaces the current transmitting station with a different one as indicated by steps 25 and 26 as follows. In one operation mode, server 12 receives an end of information packet indicating that no further packets are expected from station 14A. Alternatively, or in addition thereto, server 12 detects an interruption for a time period which is longer than a predetermined time. A preferred interruption time is one second. In either case, if a packet representing an end of speech burst is received or if the predetermined time threshold is exceeded without receiving a packet, server 12 ceases the identification of station 14A as the current transmitting station and expects to receive a packet from any second station which will be set as the active station.

If a packet is received from a second station, say telephone 18 via gateway 16, the user utilizing telephone 18 becomes the current speaker and telephone 18 becomes the current transmitting station. Similarly, any of stations 14 may become the current transmitting station.

It will be appreciated that the method of FIG. 2 is more efficient and cost effective with respect to prior art conferencing methods. Since the method of the present invention provides half-duplex conferencing, it does not require complex mixing nor an echo canceling algorithm. Furthermore according to the method of FIG. 2 each station 14 receives only a single stream of information representing the information addressed by the current active participant, therefore it requires less data handling and utilizes more efficiently existing hardware and network bandwidth.

Moreover, since the method of the present invention is media insensitive, i.e. it does not require any determination of the type of media transmitted, it is applicable to any multi-media information whether visual, graphic, midi or audio as described in the preferred embodiment or any combination therebetween.

Figure 3:
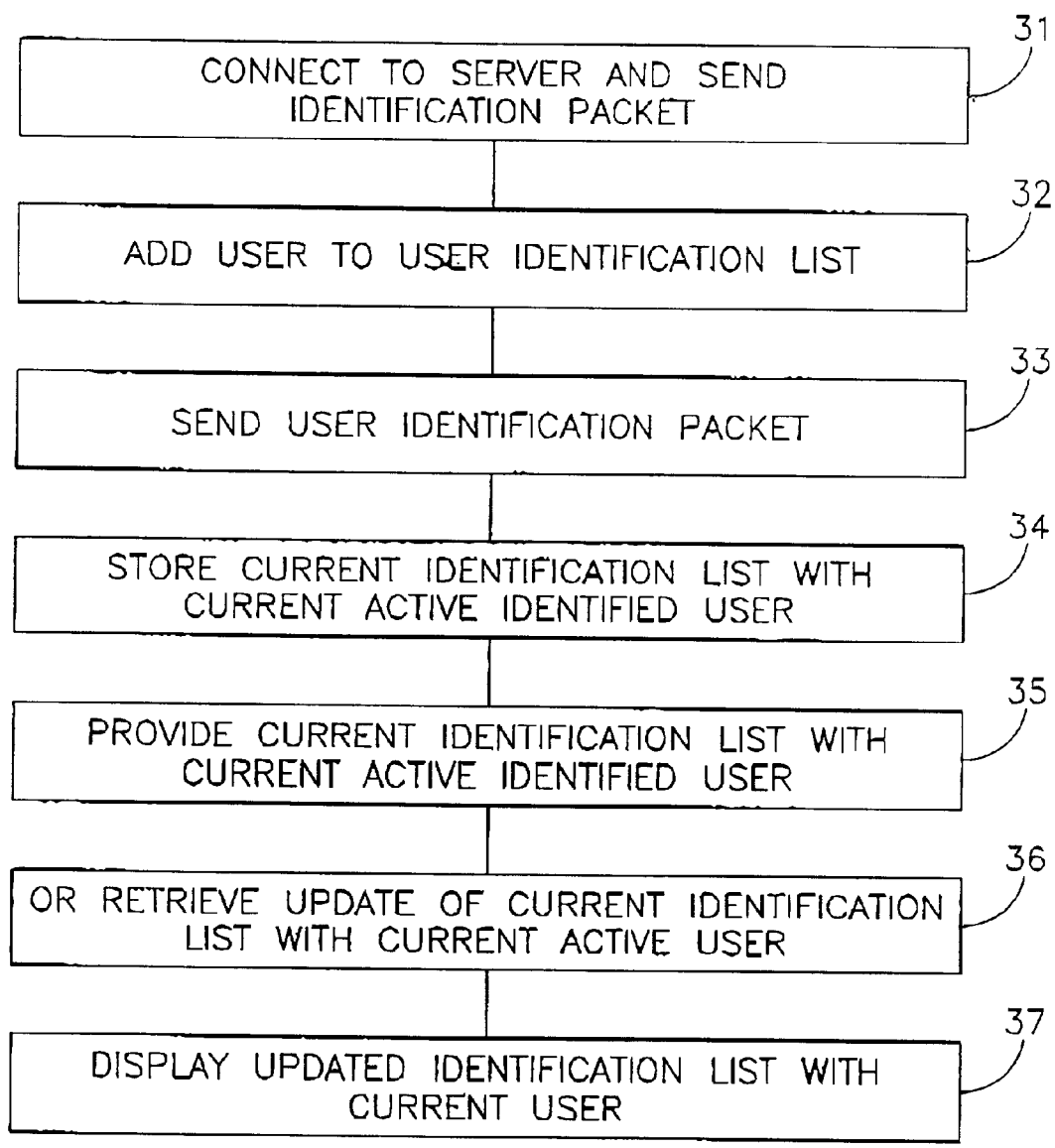
FIG. 3 is a schematic block diagram illustration of a preferred method for displaying the active participants in the multimedia multi-station conference held over the network of FIG. 1.

Reference is now made to FIG. 3 which illustrates a method for indicating to the users of stations 14 and telephone 18 a user identification of the user utilizing the station which is the current transmitting station.

At step 31 a user which did not participate before in the multi-station conference is joining the conference. Step 31 is obviously required only if a new user is joining the conference. Similarly, in step 32 if a new user joins, the name is added to an identification list of the participants in the multi-station conferencing. Otherwise, the method starts at step 33.

Step 33 includes the step of transmitting a packet including a user identification from the transmitting station, say 14A to conference bridge server 12. In step 34, the current user identification is added to the identification list of users participating the conference stored in server 12.

The updated list is then retrieved by or transmitted to each station 14 and gateway 16 in its entirety as indicated by step 35 or only an updated version thereof as indicated by step 36. Finally, as indicated by step 37 the updated list or the entire list of participant with the current user identification highlighted is displayed.

It will be appreciated that the display in stations 14 is done on the computer display whereas similar display with respect to telephone 18 requires an internal display or a different display having independent connection to WAN 10.

It will be appreciated that while the present invention is not limited by what has been described hereinabove and that numerous modifications, all of which fall within the scope of the present invention, exist. For example, while the present invention has been described with reference to half-duplex multi-station audio conferencing, the method and system of the present invention is not limited thereto and is similarly applicable to video half-duplex multi-station conferencing.

Another example described with reference to FIGS. 4 and 5 hereinbelow is to display to participants of any multi-station conference the current speaker or speakers.

Figure 4:
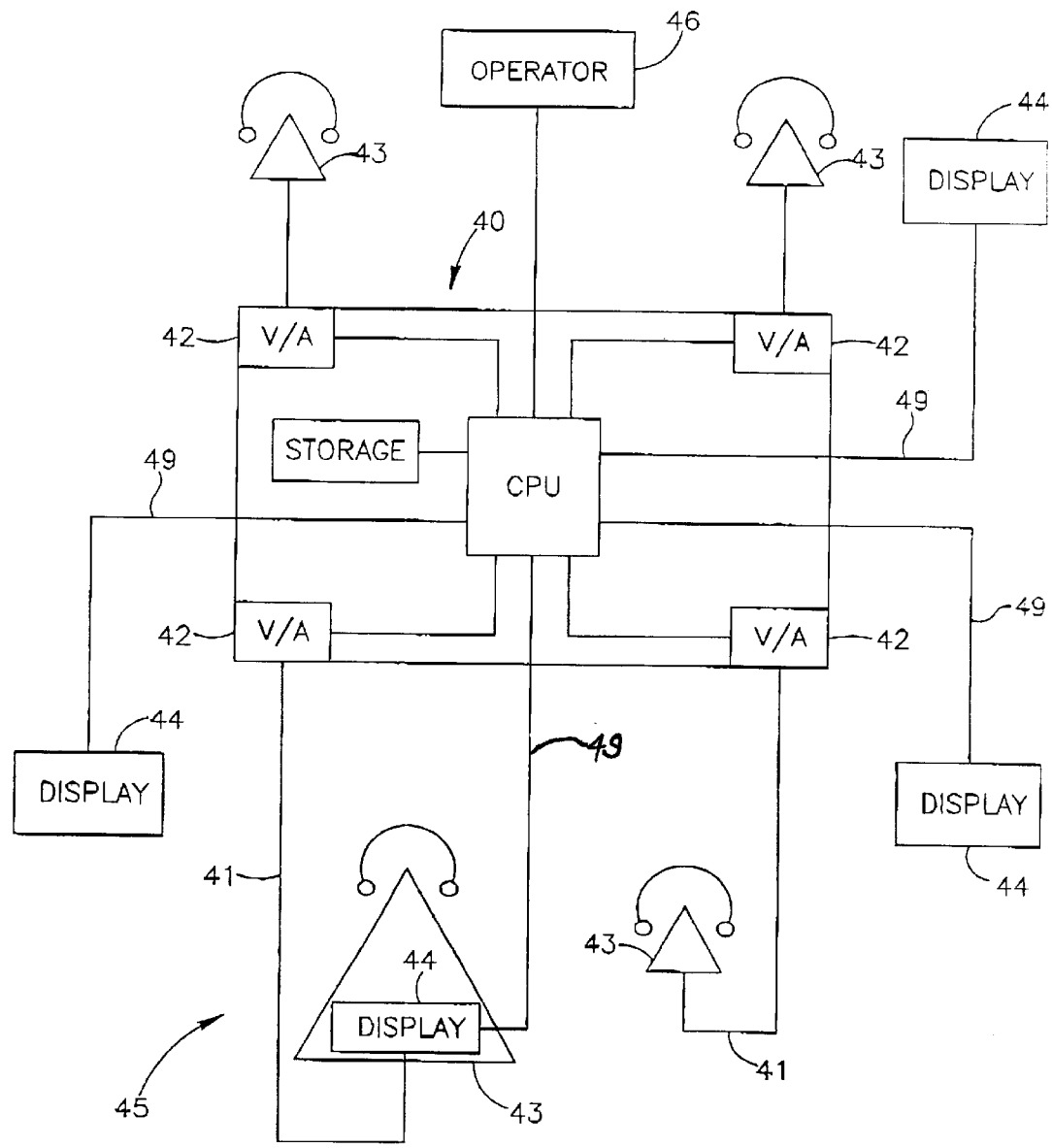
FIG. 4 is a schematic block diagram of a system for providing multi-station conferencing, constructed and operative in accordance with a preferred embodiment of the present invention.

FIG. 4 illustrates a non limiting example of a telephony multi-telephone conference. The system comprises a conference bridge server 40 having two connection channels to each participant, a telephony channel indicated by lines 41 which includes a voice activity detection unit 42 and connected to a telephone unit 43 for each user, and a display channel indicated by lines 49 connected to display unit 44 for each user.

Telephony units 43 and display units 44 may be separated and operative on difference physical networks, a non limiting example being the conventional telephony network and the INTERNET, respectively or may be lumped as shown for the unit referenced 45. For the INTERNET example, displays 44 may be similar to stations 14.

Figure 5:
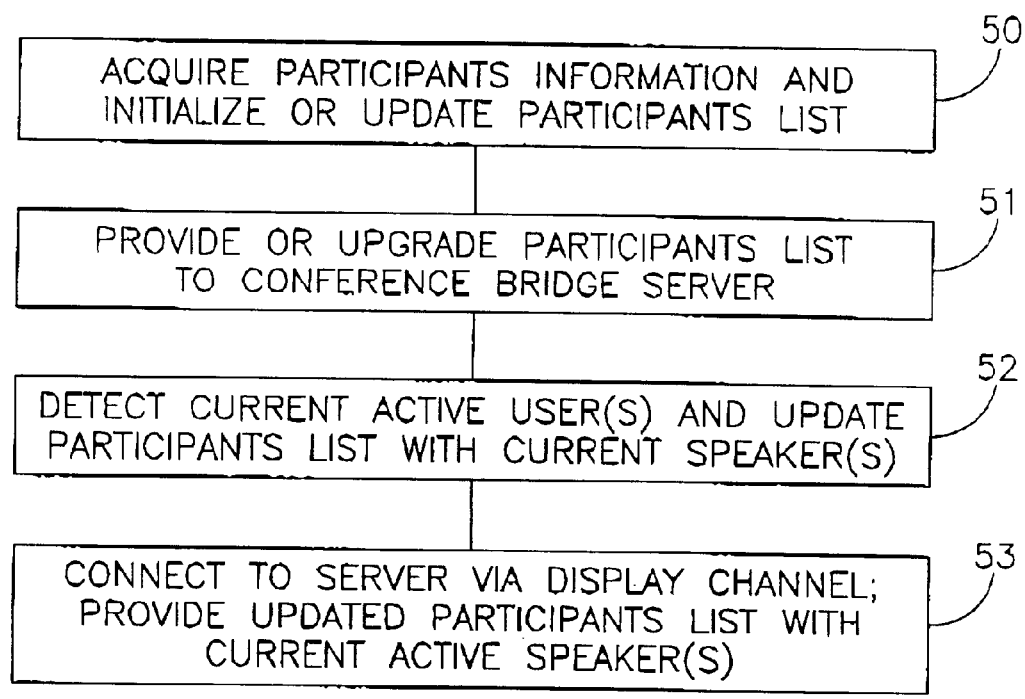
FIG. 5 is a schematic block diagram illustration of a preferred method for operating the system of FIG. 4.

A preferred operation mode of the system of FIG. 4 is described now with reference to FIG. 5. In step 50, the operator 46, a human operator or an automatic telephony operator acquires the details of the participants in the conference. In stop 51, the network identification associated with each participant is transmitted as a participants list to the conference bridge server 40 which stores a current participant list at storage unit 48.

It will be appreciated that steps 50 and 51 are repeated for each new participant joining the conference, i.e. the operator 46 updates the participant lists and provide same to CPU 47 of server 40 for storing in storage unit 48.

The conference now begins and voice activation units 42 detect a current active user or users and provide same to CPU 47 which updates participant list stored in storage unit 48 with a current active speaker or speakers as indicated by steps 52 and 53.

Each participant can now connect to server 40 using its display system for retrieving the current updated list of participants with the active participant or participants, i.e. the current speaker or speakers for display on his own display 44.

Alternatively, Displays 44 are continuously connected to server 40 and server 40 periodically transmits an updated list of participants with the current active participants to each of displays 44.

It will be appreciated by persons skilled in the art that the present invention is not limited to what has been particularly shown and described hereinabove. Rather, the scope of the present invention is defined only by the claims that follow:

What is claimed is:

1. A method for multi-media half-duplex conferencing in a half-duplex conference server operating in a wide area network comprising a plurality of stations in communication with said half-duplex conference server, the method comprising the steps of:

receiving at least one packet at said half-duplex conference server from at least one station of said plurality of stations said at least one packet including a digital representation of information comprising at least audio information;

detecting voice activity from at least one of said plurality of stations for identifying at least one of said stations of said plurality of stations as a transmitting station; and responding to said detecting voice activity including:
blocking packets from all other stations of said plurality of stations at said half-duplex conference server, except from said one transmitting station; and
distributing from said half-duplex conference server, at least one packet received from said transmitting station to at least one of any other of said stations of said plurality of stations that are operatively coupled to said half-duplex conference server.

2. The method of claim 1, further comprising the step of:
visually indicating to said stations the station which is said transmitting station.

3. The method of claim 2, wherein said step of visually indicating comprises the steps of:

transmitting at least one packet including a user identification from a station of said plurality of stations to said half-duplex conference server;

adding said user identification to a participants list of users participating in said half-duplex conference, thereby providing a current participants list;

storing said current participants list with an indication which station is said transmitting station;

providing said participants list to at least one of said stations; and displaying said participants list including said indication of said transmitting station.

4. The method of claim 3, wherein said step of storing said current participants list comprises the steps of:

storing an update of said current participants list with an indication which station is said transmitting station;

retrieving said update by each of said stations; and displaying said update and said indication of said transmitting station.

5. A conferencing system for multi-media half-duplex conferencing, operating in a computer network, said conferencing system including a half-duplex conferencing server comprising:

means for receiving at least one packet at said half-duplex conferencing server from one station of said plurality of stations, said at least one packet including a digital representation of information of at least one information type selected from audio information and video information;

a voice activity detector for identifying one station of said plurality of stations as a transmitting station;

means for responding to detected voice activity, said responding means configured for, blocking packets from all other stations of said plurality of stations at said half-duplex conferencing server, except from said one transmitting station; and distributing from said half-duplex conferencing server, at least one packet received from said transmitting station to at least one other station of said plurality of stations.

6. The system of claim 5, additionally comprising:

means for visually indicating to said stations the station which is said transmitting station.

7. The system of claim 6, wherein said indicating means are configured for:

transmitting at least one packet including a user identification from a station to said conferencing server;

adding said user identification to an identification list of users participating in said half-duplex conference, thereby providing a current participants list;

storing said current participants list with an indication of which station is said transmitting station;

providing said participants list to at least one of said stations; and displaying said participants list including said indication of said transmitting station.

8. The system of claim 7, wherein said indicating means comprises:

means for storing an update of said current participants list with an indication which station is said transmitting station;

means for retrieving said update in each of said stations; and means for displaying said update and said indication of said transmitting station.

* * * * *